US010442519B2

(12) United States Patent
Bredemeier et al.

(10) Patent No.: US 10,442,519 B2
(45) Date of Patent: Oct. 15, 2019

(54) INDICATION DEVICE AS WELL AS DOOR ARRANGEMENT AND AIRCRAFT WITH SUCH AN INDICATION DEVICE

(71) Applicant: Airbus Operations GmbH, Hamburg (DE)

(72) Inventors: Kai Bredemeier, Hamburg (DE); Carsten Heuer, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 444 days.

(21) Appl. No.: 15/240,639

(22) Filed: Aug. 18, 2016

(65) Prior Publication Data

US 2017/0050744 A1 Feb. 23, 2017

(30) Foreign Application Priority Data

Aug. 19, 2015 (EP) ..................... 15181638

(51) Int. Cl.
*B64D 45/00* (2006.01)
*B64C 1/14* (2006.01)
(Continued)

(52) U.S. Cl.
CPC ........ *B64C 1/1407* (2013.01); *B64D 45/0015* (2013.01); *G08B 3/10* (2013.01);
(Continued)

(58) Field of Classification Search
CPC ............... B64D 45/00; B64D 45/0005; B64D 45/0015; B64D 2045/003; B64D 2045/004; B64D 2045/0035; B64D 2045/005; G08B 13/08; G08B 13/1618; G08B 13/1645; G08B 13/2491
See application file for complete search history.

(56) References Cited

U.S. PATENT DOCUMENTS

| 4,797,557 A | 1/1989 | Vorzimmer et al. |
| 4,797,657 A * | 1/1989 | Vorzimmer ............ G08B 13/19 340/430 |

(Continued)

OTHER PUBLICATIONS

European Search Report, dated Feb. 18, 2016, priority document.

*Primary Examiner* — Philip J Bonzell
*Assistant Examiner* — Christopher D Hutchens
(74) *Attorney, Agent, or Firm* — Greer, Burns & Crain, Ltd.

(57) ABSTRACT

An indicating device for indicating a non-authorized opening of an aircraft door comprising a sensor for detecting a distance from the sensor to an object, a signaling device, a reset device coupled to the signaling device allowing the signaling device to be set into a first state following a reset operation, an enabling device, providing as an output signal, selectively, a disable signal and an enable signal, and a control device connected to the sensor, the signaling device and the enabling device. On receiving the disable signal, the control device changes into a first operating mode and on receiving the enable signal it changes into a second operating mode in which, based upon the signal received from sensor, it detects a distance change between the sensor and the object, and, on detecting a change, sets the signaling device into a second state until the reset operation is completed.

15 Claims, 5 Drawing Sheets

(51) Int. Cl.
    *H04W 4/02*    (2018.01)
    *H04W 4/70*    (2018.01)
    *H04W 4/80*    (2018.01)
    *G08B 3/10*    (2006.01)
    *G08B 13/08*   (2006.01)

(52) U.S. Cl.
    CPC ............ *G08B 13/08* (2013.01); *H04W 4/023* (2013.01); *H04W 4/70* (2018.02); *H04W 4/80* (2018.02)

(56) References Cited

U.S. PATENT DOCUMENTS

| | | | |
|---|---|---|---|
| 4,933,668 A | 6/1990 | Oyer et al. | |
| 5,117,217 A | 5/1992 | Nykerk | |
| 5,786,760 A * | 7/1998 | Suzuki | G08B 15/002 340/384.3 |
| 6,946,959 B2 | 9/2005 | Wang | |
| 2005/0030179 A1 | 2/2005 | Script et al. | |
| 2007/0176793 A1 | 8/2007 | Bruch | |
| 2008/0047350 A1 * | 2/2008 | Atlas | G01S 15/08 73/625 |
| 2010/0195446 A1 * | 8/2010 | Michaels | G08B 13/08 367/135 |
| 2013/0099922 A1 * | 4/2013 | Lohbihler | G08B 13/184 340/539.17 |
| 2016/0328941 A1 * | 11/2016 | Sundholm | G08B 13/1618 |
| 2017/0057659 A1 * | 3/2017 | Wood | B64D 45/0005 |
| 2018/0012458 A1 * | 1/2018 | Seelman | G08B 29/22 |

\* cited by examiner

INDICATION DEVICE AS WELL AS DOOR ARRANGEMENT AND AIRCRAFT WITH SUCH AN INDICATION DEVICE

CROSS-REFERENCES TO RELATED APPLICATIONS

This application claims the benefit of the European patent application No. 15181638.6 filed on Aug. 19, 2015, the entire disclosures of which are incorporated herein by way of reference.

BACKGROUND OF THE INVENTION

The present invention relates to an indicating device for indicating an unauthorized opening of a door of an aircraft parked on the ground, as well as to a door arrangement and an aircraft comprising such an indicating device.

For reasons of safety and security all externally accessible doors of an aircraft parked on the ground are sealed with adhesive security seals prior to leaving the aircraft behind unattended. The security seals are designed and used such that the doors cannot be opened without destroying or at least irreversibly damaging the security seals, so that a missing or damaged security seal indicates that in the absence of authorized persons, non-authorized access to the aircraft has occurred or has been attempted. In such an instance, the typical safety or security precautions require a complete inspection of the aircraft, that is, the entire aircraft must be searched by security personnel for possible intruders and dangerous objects.

The security seals are complex and time-consuming with regard to application since they have to be manually applied, checked and removed without residue by a person. Moreover, their use is associated with false alarms since they are susceptible to moisture and dirt and may drop off, and since they may also be damaged due to relative thermal expansion between a door and an aircraft fuselage without an unauthorized opening of the door. Moreover, security seals may be forged or may come into possession of unauthorized persons, and have to be re-purchased continuously since they are meant to be used only once.

SUMMARY OF THE INVENTION

It is an object of the invention to provide an indicating device for indicating an unauthorized opening of a door of an aircraft parked on the ground that is simple, secure and cost-effective in application and is not susceptible to false alarms, as well as a door arrangement and an aircraft comprising such an indicating device.

An indicating device for indicating an unauthorized opening of a door of an aircraft parked on the ground, in particular of an unattended aircraft, is provided. The indicating device comprises a sensor for detecting or sensing a distance between the sensor and an object that is located within a detection zone of, for example, two to five meters in front of the sensor. As will be described in more detail below, subsequent to arrangement or placement of the sensor or of the entire indicating device on a door of an aircraft, such an object is, in particular, a fixed part or component of the aircraft, which has a static reference position with respect to the sensor. As will also be described in more detail below, further such objects may also be, in particular, persons who are approaching the door.

Moreover, the indicating device comprises a signaling device that has a first state and a second state, and a reset device that is connected to or coupled with the signaling device, which reset device is adapted or configured to place or bring the signaling device into the first state when a user carries out a predetermined reset operation. The reset device may be part of the signaling device or it may be designed as a separate component. Moreover, the indicating device comprises an enabling device, which is adapted or configured to provide as an output signal, selectively, a predetermined disable signal and a predetermined first enable signal. The enabling device may, for example, be constructed such that the provision of the disable signal or the first enable signal, respectively, is triggered selectively by performing a predetermined disabling operation or a predetermined first enabling operation, respectively, at the enabling device or a separate component of the indicating device or a separate device by a user.

Lastly, the indicating device comprises a control device that is connected to or coupled with the sensor, the signaling device and the enabling device. This makes it possible for the control device to receive signals from the sensor and the enabling device, and to transmit control signals to the signaling device. The control device is adapted or configured to change into a first operating mode when receiving the disable signal from the enabling device and to change into a second operating mode when receiving the first enable signal from the enabling device. The change into the first operating mode or into the second operating mode, respectively, may preferably be confirmed by an optical or acoustic signaling or signal, or through different optical or acoustic signaling or signals, by means of an optional suitable optical or acoustic signal device, which will be described in more detail later.

The control device is adapted or configured in such a manner that in the second operating mode, which, in contrast to the first operating mode in which the opening of a door is not monitored, is a monitoring mode in which the opening of a door is monitored in the manner described below, the control device detects, based on a sensor signal provided by the sensor and characteristic of the distance between the sensor and the or an object, respectively, a change or variation of the distance between the sensor and the object and upon detection of a change or variation of the distance sets or places the signaling device into the second state until the predetermined reset operation is carried out, in particular through generating a corresponding control signal that is transmitted to the signaling device and to which the signaling device reacts accordingly. Since the signaling device is set into the second state until the predetermined reset operation is carried out, the first state can no longer be obtained by establishing the original distance or a particular distance, such as, for example, through closing the door. In this context, provision may be made that the control device causes the setting into the second state upon detection of any variation or change. It is, however, preferred if the control device is adapted or configured so that it causes the setting into the second state only at a predetermined minimum variation or change, that is, upon a variation or change of distance that exceeds a predetermined value, and/or a variation or change of the distance over a predetermined minimum time span. By means of these measures the risk of false alarms can be further reduced since minor variations or changes in distance or brief interferences that are not caused by the opening of a door do not result in a change in state of the signaling device. Alternatively, or additionally, it may be advantageous if the control device is adapted and configured such that it only reacts to a variation or change that corresponds to an increase of the distance or a reduction of the distance.

The above design makes it possible to reliably and unambiguously determine whether a door of an aircraft was opened or whether some other unauthorized access to the aircraft has taken place. To achieve this, the sensor is arranged or mounted, respectively, on a door of the aircraft, which door is spaced inside the aircraft from a stationary component such as, for example, a section of the floor, a wall section, a portion of a galley or portion of a structure or monument, or on the stationary component in such a manner that the stationary component or the door, respectively, is located inside the detection zone of the sensor, and that opening of the door causes a variation or change of the distance between the sensor and the stationary component or the door, respectively. Subsequently, with the door closed, the first enable signal is provided by the enabling device to ensure that the signaling device is initially in the first state. Then, a change of the signaling device from the first state into the second state, which change can be determined at any time by inspecting the signaling device, indicates that the door has been opened. The indicating device may, for this purpose, comprise a display, on which it is displayed continuously, or upon user request, whether the signaling device is in its second state, or an optical indicator in form of an LED, for example. Note should be taken of the fact that, with the indication according to the invention, a situation can arise where a change of the signaling device from the first state into the second state takes place without the door having been opened, namely if a person inside the aircraft moves through the detection zone of the sensor, which therefore detects a variation or change of the distance to an object. However, since the signaling device is intended to monitor a parked aircraft where typically no person is on board, this is even helpful since it is also possible to detect events in which a person has gained access to the aircraft in a way other than through the monitored door.

The indicating device has the advantage that it can be installed once in or on an aircraft for monitoring a door and can then be used again and again so that its application is very simple and cost-effective in the long term. Moreover, it is less sensitive to false alarms and manipulation than security seals are.

For its operation, the indicating device may comprise its own independent power supply, such as, in particular, a rechargeable or non-rechargeable battery, or a power supply connection or terminal for connection to an external power supply, such as, in particular, an on-board power supply system or mains or line power of an aircraft.

It is generally possible that the reset device and/or the enabling device are provided as part of the control device, i.e., are constituted by or implemented in the control device, or that the reset device and/or the enabling device are provided as separate components. It is also possible that one of the two devices is provided as part of the control device and the other one as a separate component. Moreover, and independent from this, the control device may, for example, be provided in the form of an electronics unit or as part of an electronics unit. If the reset device or the enabling device is provided as a separate component, the respective device may preferably be part of the same electronics unit as the control unit, or it may also be provided on a separate electronics unit.

In a preferred embodiment the signaling device comprises a non-volatile electronic memory or storage device. Here the first state and the second state correspond to different predetermined values that are stored in a predetermined memory or storage area of the memory device. In other words, a predetermined memory area exists in which different values can be stored. If one or more first predetermined values are stored in the memory area, the signaling device is in its first state, and if one or more second predetermined values are stored in the memory area, the signaling device is in its second state. Such a design of the signaling device is particularly easy to implement and is particularly tamper-proof.

In this embodiment the signaling device may further comprise an optical signal device for emitting an optical signal and/or an acoustic signal device for emitting an acoustic signal. The control device is then adapted or configured to operate the optical signal device and/or the acoustic signal device to emit the optical signal or the acoustic signal, respectively, upon or subsequent to setting the signaling device into the second state. In particular, the second state may comprise the emission of the optical signal and/or the acoustic signal. Since the memory state of the memory device cannot, or not easily, be recognized from the outside, the provision of an optical signal device and/or an acoustic signal device has the advantage that the opening of a door becomes immediately apparent. Should the optical signal device and/or the acoustic signal device fail, for example due to a depletion or interruption of a power supply or due to a damage of the optical signal device and/or the acoustic signal device, the second state can still be determined by inspecting or investigating the memory state of the memory device.

In a preferred embodiment, the sensor is adapted or configured to detect the distance on the basis of the travel time of a signal that is emitted by the sensor or by a separate signal emission device, is reflected by the object and is received by the sensor. For example, the sensor may, in particular, be an ultrasonic sensor. The latter may periodically emit an acoustic signal in the ultrasonic range, which is reflected by objects within the detection or monitoring zone, respectively, and reflected back to the sensor. The distance of the object from the sensor can be determined from the time difference between the emitted and the received signal. Sensors of this kind are sophisticated, readily available commercially and cost-effective. Moreover, ultrasonic sensors have a comparatively low weight and still permit a precise measurement and an adjustable sensor characteristic.

In a preferred embodiment, the enabling device comprises a receiver for receiving wireless signals and is adapted or configured to provide the disable signal upon receiving a first predefined wireless signal and to provide the first enable signal upon receiving a second predefined wireless signal. These wireless signals may, for example, be emitted by a dedicated remote control unit without which an enabling and disabling is not possible. So as to make the monitoring or intercepting of the wireless signals more difficult, wireless signals of low range may be used, such as, for example, NFC signals.

In a particularly preferred version or variant of this embodiment, the receiver is an RFID receiver, and the first and second predefined wireless signals can be generated by an RFID transmitter with predefined identifier, which is preferably part of a system that also comprises the indicating device. The RFID receiver and RFID transmitter may, in particular, be paired, so that the wireless signal received by the RFID receiver is examined for a predetermined identifier assigned to the RFID transmitter, and/or the RFID receiver expects that the wireless signal transmitted by the RFID transmitter is encrypted with a predetermined encryption assigned to the RFID transmitter so that the RFID receiver is able to verify the authenticity of the wireless signal or its origin from the RFID receiver. For example, an especially assigned key pair may be stored in the RFID receiver and in the RFID transmitter. Independently from that, the RFID receiver may be an RFID reading device, which provides power for the operation of the RFID transmitter by way of a transmitted interrogating signal, provided that the RFID transmitter is located within a predetermined distance from the RFID reading device and which may be an RFID tag. Advantageously it is then sufficient to place the RFID transmitter, which is preferably designed as a portable unit, temporarily or briefly in the vicinity of the indicating device in order to operate or actuate the enabling device, that is, the portable unit need only be brought close to the indicating device by authorized personnel for the purpose of enabling or disabling. To this end the RFID transmitter may comprise a switch to establish or determine whether the first or the second wireless signal is transmitted, or the first and the second wireless signal may be identical and the enabling device changes between providing the disable signal and the first enable signal every time this signal is received. Alternatively, it would also be possible for the RFID reading device to transmit information to the indicating device with its interrogating signal concerning the fact whether the control device is in the first operating mode or in the second operating mode, and that the RFID transmitter is adapted or configured to be able to determine the current operating mode from the interrogating signal and to transmit, depending on the detected operating mode, the first or the second wireless signal to the enabling device, so that a change in operating mode is taking place. The two latter options, which do not require a switch on the RFID transmitter, are particularly simple to use.

In an alternative preferred embodiment, the enabling device comprises a signal input for wirelessly or wiredly receiving external signals and is adapted or configured to provide as output signal the respective received external signal, or to provide as output signal the disable signal, if a first predetermined external signal is received, and the first enable signal, if a second predetermined external signal is received. In the former case, the disable signal or the first enable signal, respectively, is provided if it is received as external signal, that is, it is externally generated and simply passed on. In contrast, the latter case permits the connection to a central or associated separate control unit—for example via an AFDX network data line, a CAN network data line, or the like, or a different data line that is present in an aircraft door—and thus the possibility, where necessary, of simultaneously enabling or disabling, respectively, multiple indicating devices. The external signals may, for example, also be generated by a code input device, or the code input device may be part of the enabling device.

In a preferred embodiment, the predetermined reset operation is the receipt of a predefined wireless or wired reset signal by the indicating device. In this respect the exact same possibilities exist as they were described above for the enabling device, that is, the reset device may comprise a receiver for receiving wireless signals, and in particular an RFID receiver, wherein the receiver or RFID receiver, respectively, may be the same as the one described above for the enabling device, or a receiver with the same characteristics, or the reset device may comprise a signal input for the wireless or wired reception of external signals, for which the same applies as was described for the signal input of the enabling device.

In a preferred embodiment, the indicating device is constructed or configured as a cohesive or continuous, compact unit that may be arranged or mounted, respectively, on a door or a door panel or leaf, respectively, of an aircraft door or which may be integrated into the door trim or lining of an aircraft door. In other words, the sensor, the signaling device, the reset device, the enabling device and the control device—and also other components, if applicable—constitute or combine into such a continuous, compact unit. An indicating device of this kind is particularly reliable and can easily be retrofitted, and no significant modifications are required within the respective aircraft or on a door, in particular.

In this embodiment, it is particularly preferred if the indicating device further comprises an optical signal device for emitting an optical signal—such as, for example, the above-mentioned optical signal device that is activated upon or subsequent to setting or bringing the signaling device into the second state—and an acoustic signal device for emitting an acoustic signal—such as, for example, the above-mentioned acoustic signal device that is activated upon or subsequent to setting or bringing the signaling device into the second state—which also form part of the unit. In other words, they form, together with the sensor, the signaling device, the reset device, the enabling device and the control device—and other components, if applicable—the continuous, compact unit. The control device is preferably adapted or configured to operate at least one of the optical signal device and the acoustic signal device when a person approaches to within a distance that is less than a predetermined limit, i.e., limit distance. In this instance, the control device may preferably be adapted or configured to operate the optical signal device when a person approaches to within a distance that is less than a first predetermined limit, and to operate the acoustic signal device when a person approaches to within a distance that is less than a second predetermined limit, wherein the first limit is greater than the second limit. When a person approaches the indicating device it may, for example, emit at first an optical signal so that the person is already informed about the approximation at a relatively large distance, that is, significantly more than an arm's length, preferably at most 1.1 m, for example, to warn that an emergency slide is active, as will be described in more detail below. When a person approaches closer than the second limit, which is, for example less than 1 or 1.5 arm's lengths, preferably at most 0.5 m, an additional acoustic signal may be emitted, which warns the person explicitly, for example, to the fact that the emergency slide will be deployed if a handle provided on the door is operated.

If the control device is adapted or configured to operate at least one of the optical signal device and the acoustic signal device when a person approaches to a distance of less than at least one predetermined limit, this possibility can be provided as a third operating mode, beside the first operating mode and the second operating mode. The first operating mode is then, for example, an operating mode in which the indicating device as a whole is not active. Moreover, it may also be provided that the third operating mode may be selectively carried out simultaneously with the second operating mode, that is, that in a combined operating mode, the control device is adapted or configured both to set or bring the signaling device into the second state until the predetermined reset operation upon a variation or change of the distance between the sensor and an object, and to operate at least one of the optical signal device and the acoustic signal device when a person approaches to a distance of less than at least one predetermined limit. The control device is then preferably further designed such that a change is possible between any of the available operating modes, that is, between the first, second and third operating modes and possibly the combined operating mode. The change can take place in the same manner as described above for the change between the first and the second operating mode. For example, further corresponding enable signals may be provided for, to which the control device reacts accordingly. Alternatively, it is also possible that the control device in the second operating mode is adapted or configured to operate at least one of the optical signal device and the acoustic signal device upon an approach of a person to within less than at least one predetermined limit.

The above-described compact units may preferably comprise a housing comprising a fastening section and a visible side. The fastening section is designed to undergo a mechanical connection with the door trim or lining or with a fastening means on the aircraft door. If the indicating device comprises an optical signal device, it is preferred if the housing is at least partially transparent in a section that holds or accommodates the optical signal device. Thus, the form or shape of the housing does not need to differ from that of a commonly used warning lamp, and the components that are integrated therein are largely protected from external influences, wherein the visibility of the optical signal device is guaranteed.

In the above-described embodiments, in which the control device is adapted or configured to operate at least one of the optical signal device and the acoustic signal device when a person approaches to a distance of less than at least one predetermined limit, the indicating device is advantageously, in particular, also adapted or configured to indicate the activation status of an emergency slide in an aircraft.

In larger passenger aircraft, aircraft doors can be coupled or are connectable to an emergency slide trigger or actuation device, so that when the respective aircraft door is opened, an emergency slide installed therein is actuated or deployed. For this purpose, prior to take-off and with the doors closed, an emergency slide safety release lever is moved into an "aimed" mode. After normal landing the emergency slide safety release lever is moved into a "disarmed" mode so that a coupling or connection to the emergency slide actuation device is disabled and the aircraft doors can be opened normally.

The position of the emergency slide safety release lever is visually clearly recognizable. In addition, a warning light may be installed in or on the aircraft door, which warning light provides an optical indication of the state of the emergency slide activation. However, due to time pressure and unpredictable situations on board the aircraft, it can happen occasionally that the emergency slide activation lever remains in the "armed" state after landing, and when opening an aircraft door, an emergency slide is deployed accidentally. This causes damage near the aircraft and leads to high subsequent costs and uncertain down-times for the aircraft due to the required complex and time-consuming re-integration of the emergency slide. This is independent from the door design and from the aircraft manufacturer. There are solutions that prevent the accidental deployment of emergency slides, for example through facilities that detect the contacting of a component of an aircraft door by a person and which emit an optical and/or acoustic warning if a person approaches the door or touches the handle if the emergency slide actuation device is coupled with the aircraft door. However, a solution of this kind may require a modification of the aircraft door.

In the context of emergency slides, it is therefore desirable to provide an effective device for indicating the activation status of an emergency slide and for preventing the accidental deployment of an emergency slide, which is particularly reliable and easy to retrofit, and wherein no significant modifications are required inside the respective aircraft and, in particular, on a door, if possible. This object is achieved by the above embodiments in which the control device is adapted or configured to operate at least one of the optical signal device and the acoustic signal device when a person approaches to a distance of less than at least one predetermined limit.

The optical signal device then serves to generate an optically visible signal that indicates to a person that an emergency slide is actuated, i.e., deployed, when a door of the aircraft is opened. Any kind of indicating device may be used to generate this signal, as for every one of the signal devices mentioned above, which, in particular, selectively generate a light signal, for example through an illuminating device on the basis of an incandescent lamp, an LED or a plurality of those. The illuminating device may be designed to emit a continuous light or a flashing light, where the optical perceptibility of a flashing light may be greater than that of a continuous light.

Analogous hereto and exactly like every one of the above-mentioned acoustic signal devices, the acoustic signal device may comprise a sound-generating unit with which an acoustically perceptible signal can be generated. The sound-generating device may comprise for this purpose a speaker or buzzer that is electromagnetically or piezoelectrically operable and, if required or desired, a device for the selective emission of a signal sequence to play back a recorded or synthetic sound.

In these embodiments, the sensor is, moreover, able to detect an approach of a person towards the sensor and thus towards the indicating device that accommodates it, so that it is possible to determine whether and/or at what distance a person is in front of the sensor. Based upon information determined by the sensor, the control device connected thereto is able to selectively operate the optical signal device and the acoustic signal device. Specifically, this means that the control device is able to emit an optical and/or acoustic warning signal, based on the distance of a person from the sensor or the indicating device, respectively, through which optical and/or acoustic warning signal the person is made aware of the fact that if the door is opened one has to expect deployment of the emergency slide. Moreover, the indicating device is preferably configured and designed such that, as with commonly used warning lights, a continuous light is generated by the optical signal device and a continuous sound is generated by the acoustic signal device, respectively, as soon as the door opening lever is moved by a predetermined amount towards the door opening position when the emergency slide is armed. To this end, the control device is connected to an external sensor for detecting the position of the door opening lever.

Due to the design of the indicating device as a compact unit, which can be integrated into the door trim or lining of the aircraft or attached or mounted, respectively, to an aircraft door, it is therefore readily possible to replace a commonly used warning lamp for an emergency slide activation with the indicating device according to the invention. The indicating device is preferably to be designed such that it is configured, at least in the section necessary for attachment, like a commonly used warning lamp, so that the door trim or lining and a corresponding cut-out or a fastening means attached thereto do not have to be modified. The indicating device according to the invention has therefore a great potential for retrofitting since it requires only the replacement of a commonly used warning lamp with the indicating device according to the invention. The same applies also for the other, above-explained embodiments in which the indicating device is designed as a compact unit, but in which the control device is not adapted or configured to operate at least one of the optical signal device and the acoustic signal device when a person approaches to a distance that is less than at least one predetermined limit and which possibly do not comprise an optical signal device and/or an acoustic signal device. With those it is only necessary that a commonly used emergency slide warning function is integrated into the indicating device.

With the above embodiments, in which the control device is adapted or configured to operate at least one of the optical signal device and the acoustic signal device when a person approaches to a distance that is less than at least one predetermined limit, it is further preferred that the control device is provided with at least one enable signal input and is adapted or configured to activate or interrupt the operation of the optical signal device and the acoustic signal device based on a second enable signal that can be received via the enable signal input. In this manner the control device is able to make the operation of the optical signal device and the acoustic signal device dependent on the landing state of the aircraft and/or the position of an emergency slide activation lever located on the respective door. This has the advantage that a corresponding monitoring only takes place when the aircraft has landed and the emergency slide activation lever is in a certain position, where there is the danger that the door is opened without disabling the emergency slide activation lever. During regular flight operation, on the other hand, monitoring is not necessary because in that case there is no danger that a door is opened. A second enable signal, which depends on the landing state of the aircraft, may be generated by a separate device and transmitted to the enable signal input when the aircraft is on the ground. A further second enable signal, which depends on the position of the emergency slide activation lever, may be generated by a further sensor that is installed inside or on the emergency slide activation lever, monitors the position of the emergency slide activation lever and transmits a corresponding signal to the at least one enable signal input. In this regard, a sensor that already exists on the emergency slide activation lever, provided that its output signal is usable for the indicating device, or a separate, dedicated sensor, for example a retrofitted one, may be used. It is also possible to combine multiple different second enable signals, for example a second enable signal that is characteristic for the landing state and a second enable signal that is characteristic for the position of the emergency slide activation lever.

A second enable signal that depends on the landing state may be generated and transmitted by a central, already existing system of the aircraft. It is appropriate in these instances to connect the indicating device according to the invention via a corresponding bus or network with this central facility, for example via an AFDX network, CAN network, or the like. It is, however, also possible to connect the indicating device to a source for discrete or logic signals, respectively. The prerequisite for this is in all instances that a corresponding data cable or an individual line, respectively, is available in the door or is retrofitted to integrate it into the door. Nevertheless, it is also possible to use a wireless connecting device for this or a data transmission system that uses a power supply line that leads into the door.

In a further embodiment in which the control device is adapted or configured to operate at least one of the optical signal device and the acoustic signal device when a person approaches to a distance of less than at least one predetermined limit, the indicating device, moreover, comprises, coupled to the control device, an acceleration measuring unit with a G-sensor, i.e., an accelerometer or an acceleration sensor, respectively, and/or an inertial measurement unit with at least one inertial sensor for the continuous or periodic detection of at least one directional acceleration, where the control device is adapted or configured to determine based on the detected at least one directional acceleration whether the aircraft is on the ground. A G-sensor is preferably able to measure the acceleration along three spatial axes and is preferably based upon MEMS technology. An inertial sensor would be able to not only detect acceleration along one of three spatial axes but also angular acceleration around one of three spatial axes. By using a G-sensor and/or at least one inertial sensor it is possible to follow or monitor the movement of the aircraft and to determine from this whether the aircraft is on the ground or in flight. Different methods can be used to achieve this. For example, it is possible to capture a flight profile by continuously following or monitoring the movement of the aircraft, which flight profile comprises a climbing phase, a cruise flight with one or more cruising altitudes, a descending phase and a subsequent rolling or taxiing phase, in which the aircraft is strongly decelerated and an acceleration in the vertical direction is negligible. It would also be possible to just detect a characteristic landing shock that follows a descending phase, to detect a significant deceleration in longitudinal direction of the aircraft and/or to detect the obligatory turning process that takes place after every landing during the change from runway to taxiway. The different methods may require different arrangements with differently designed G-sensors or a different number of inertial sensors; when detecting a landing shock, it may be sufficient to use a single G-sensor or a single inertial sensor that detects the acceleration along the vertical axis of the aircraft. However, it is particularly appropriate to utilize commercially available and preferably standardized three-axes or six-axes sensors, which are able to detect not only static positions but also dynamic position changes and which are implemented, for example, each with a three-axes rotation rate sensor and a three-axes acceleration sensor on one chip. The determination whether or not the aircraft is on the ground is therefore made by the indicating device according to the invention itself. Thus, a connection to a bus or a network possibly not available in the door or the door trim or lining, respectively, does not need to be retrofitted so that the indicating device according to the invention is very flexible in its utilization for the most diverse aircraft types and aircraft doors.

It is further advantageous, depending on which side of the fuselage the respective door is located, to provide the indicating device and/or the acceleration measuring unit and/or the inertial measuring unit with a device for defining a flight direction, that is, on the right or left side of the fuselage. It is appropriate to always construct the indicating device according to the invention as the same component or unit that can be integrated into many different aircraft doors. The acceleration measuring unit and/or the inertial measuring unit integrated into the indicating device can therefore be oriented in two different ways with respect to the flight direction. The installation side of the indicating device with respect to the flight direction must therefore be known in order to be able to reliably identify the landing state of the aircraft from the signals provided by the acceleration measuring unit and/or the inertial measuring unit. Besides the setting "ex-factory" by means of respective firmware in the control device it may also be appropriate to provide a setting by way of jumpers on pins, that is, through pin programming, on the control device for setting during the installation of the indicating device.

In all embodiments in which the indicating device is designed as a compact unit, the indicating device preferably comprises a housing having a fastening section and a visible side. The fastening section is designed to engage mechanically with the door trim or lining or a fastening means on the aircraft door. The sensor and, if applicable, one or more of the above-mentioned optical signal devices extend at least partially towards the visible side. The arrangement of the optical signal device or devices in a region close to the visible side allows for an unimpeded perception of the respective generated and emitted optical signal. The sensor, moreover, is preferably arranged in a region near the visible side to allow the uninterrupted monitoring of a detection or monitoring zone that is located in front of the indicating device and thus in front of the door or the door trim or lining, respectively, inside the aircraft. This detection zone is defined as a spatial section located in front of the aircraft door or as a surface area of a floor located in front of the door or the door trim or lining, respectively, by means of selecting and fine-adjusting the sensor and extends into the inside of the aircraft, that is, an area that faces away from the inside of the door or the door trim or lining, respectively. To permit an unimpeded perception of the optical signal of an optical signal device and an unimpeded or uninterrupted monitoring, the sensor and the respective optical signal device may be arranged side by side or one above the other on the visible side.

Moreover, according to the present invention, a door arrangement for an aircraft is provided, which door arrangement comprises a door panel or leaf with a first side and an opposite second side, which door panel or leaf is adapted or configured to be installed in an opening in a fuselage of an aircraft in such a manner that it is moveable between a closed position, in which it closes the opening and the first side faces an interior space of the aircraft and the second side faces outwards, and an opened position, in which the opening is accessible. Moreover, the door arrangement comprises an indicating device according to one of the above described embodiments, wherein the sensor is disposed on the door panel or leaf, for example, in that it is mounted or integrated in or on a door trim or lining.

Furthermore, according to the present invention an aircraft is provided, which comprises a fuselage, in which an opening if formed, and a door panel or leaf with a first side and an opposite second side. The door panel or leaf is adapted or configured to be installed in the opening in such a manner that it is moveable between a closed position, in which it closes the opening and the first side faces an interior space of the aircraft and the second side faces outwards, and an opened position, in which the opening is accessible. Moreover, the aircraft comprises a stationary component such as, for example, a floor, a wall section, a portion of a galley or a portion of a structure or monument inside the aircraft. The stationary component is located at a distance from the door panel or leaf. The aircraft, furthermore, also comprises an indicating device according to one of the above described embodiments. The sensor is arranged on the door panel, as described above with reference to the door arrangement, or on the stationary component in such a way that the stationary component or the door panel or leaf, respectively, is located in the detection zone of the sensor and an opening of the door panel or leaf causes a variation or change of the distance of the sensor from the stationary component or the door panel or leaf, respectively.

BRIEF DESCRIPTION OF THE DRAWINGS

In the following an embodiment of the invention is described in more detail with reference to the attached drawings.

DETAILED DESCRIPTION OF THE PREFERRED EMBODIMENTS

Figure 1:
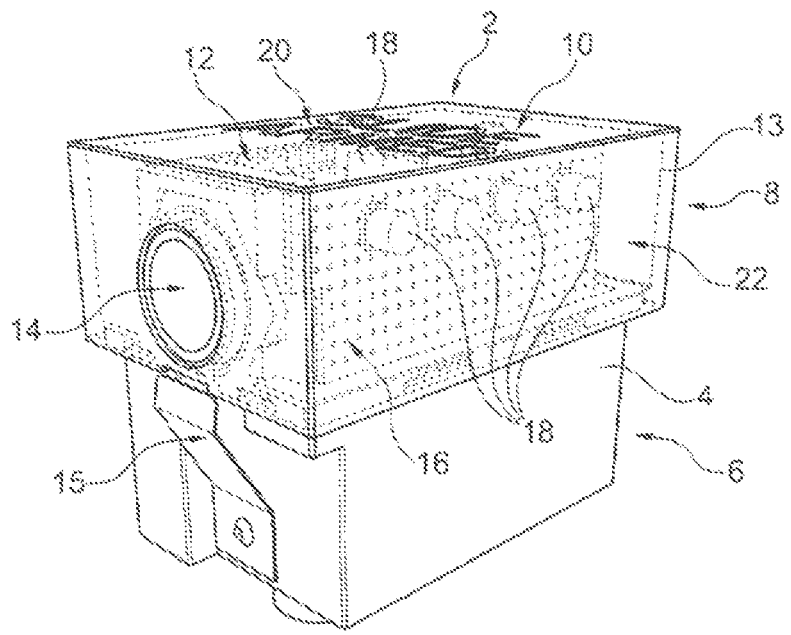
FIG. 1 depicts an indicating device according to the invention in a three-dimensional view.

FIG. 1 depicts an indicating device 2 according to the invention, comprising a housing 4 with a fastening section 6 and a visible side 8. Disposed in indicating device 2 is a signaling device that is obscured in FIG. 1 and that is in form of an non-volatile electronic memory 9 (see FIG. 8), an optical signal device 10 comprising, as an example, a plurality of lighting or illuminating devices 18, an enabling device in the form of an RFID reading device 11 obscured in FIG. 1 (see FIG. 8), a reset device obscured in FIG. 1 and connected to the memory 9 in the form of a further RFID reading device 17 (see FIG. 8), an acoustic signal device 12 obscured in FIG. 1 and a sensor 14 for detecting the distance of an object from the indicating device 2. As an example, the optical signal device 10 and the sensor 14 are arranged on the visible side 8 one below the other or beside each other, that is, consecutively along a spatial axis, whereas, as an example, the acoustic signal device 12 is located inside the indicating device 2 and facing away from the visible side 8. The fastening section 6 may further comprise elastic retaining clips 15 which, when inserting the fastening section 6 into a corresponding opening in a door trim or lining, form a positive and/or friction-type connection therewith.

Figure 6:
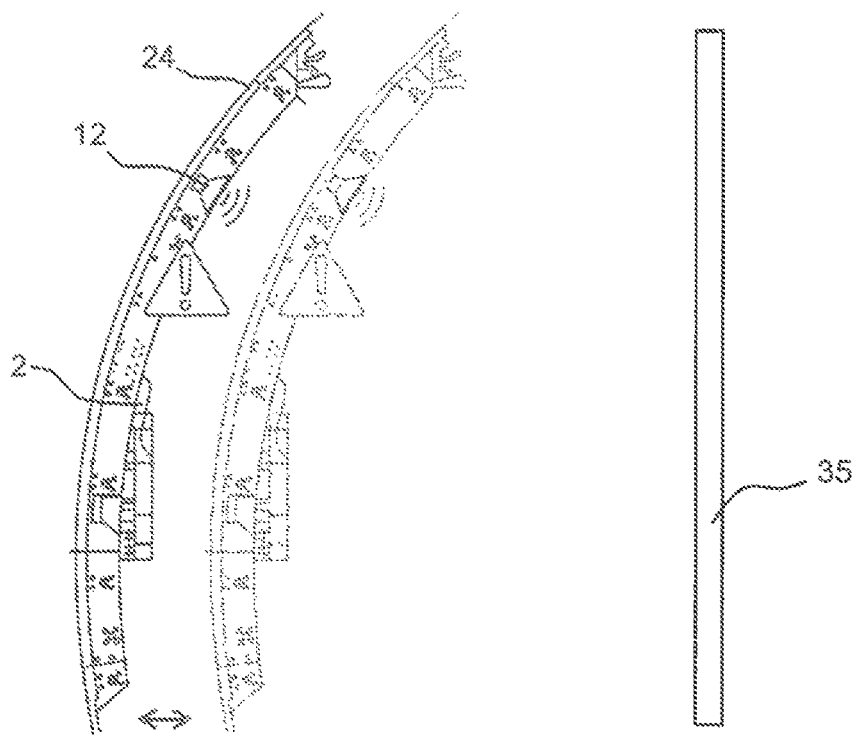
FIG. 6 shows an aircraft door, provided with the indicating device, during an opening process.

A control device in form of an electronics unit 16, which is also disposed in the indicating device 2 and of in this depiction, in particular, a printed circuit board, is recognizable, is connected to the memory 9, the optical signal device 10, the enabling device 11, the acoustic signal device 12 and the sensor 14, and is configured to selectively operate in a first warning mode the optical indicating device 10 and the acoustic signal device 12 and to store in a second monitoring mode an indication of a variation or change of the distance in the memory 9, wherein the operating in the first warning mode and the storing in the second monitoring mode is done on the basis of a detected distance of an object to the indicating device 2 or the sensor 14, respectively. This can be achieved in the warning mode, for example, through defining at least one limit or limit distance 32, 34 shown in FIG. 2, which an object is allowed to reach at most, so that the optical signal device 10 and the acoustic signal device 12, respectively, are operated. As will be explained below with reference to FIGS. 2 and 6, in the monitoring mode this can be achieved through defining a value by which the distance to a defined object may vary or change, at most, before the indication is stored in the memory 9.

For changing between the two operating modes, the enabling device 11 is provided, which, in the example, is designed as an RFID reading device. It is designed and configured such that it transmits at regular intervals a wireless interrogating signal with a code assigned to it, and that it reacts to a certain wireless response signal, which it receives from a passive RFID tag that is powered by the interrogating signal. This RFID tag, which together with the indicating device 2 forms a system, is paired with the enabling device 11, that is, it is configured so that it reacts to an interrogating signal having the code of the enabling device 11 with the transmission of a response signal with a code assigned to the RFID tag. The enabling device 11 analyses the response signal as to whether it contains the code of the RFID tag it is paired with. Only if this is the case will it cause a change in the operating mode of the electronics unit 16 by transmitting a first enable signal as an output signal to an enable signal input 59 of the electronics unit 16 if the electronics unit 16 is in the warning mode, and by transmitting a disable signal if the electronics unit 16 is in the monitoring mode (see FIG. 8).

The electronics unit 16 may comprise one or more additional enable signal inputs 56, 58 to which an enable signal may be transmitted. This is used to initiate the operation of the optical signal device 10 and the acoustic signal device 12 only when the aircraft is on the ground and the respective aircraft door can be opened at any time, that is, to activate the warning mode only in this case.

In the exemplary embodiment shown, the optical signal device 10 is separated from the visible side 8 only by a transparent cover 13, or is disposed in a cut-out provided therein, so that an unrestricted visibility of the optical signal device 10, that is, the illuminating devices 18, is allowed for, which illuminating devices 18 are suitable to generate a sufficiently bright light, flashing or continuous. The optical signal device 10 furthermore comprises as an example a lettering 20 ("Slide Armed"), which is configured as the only non-transparent surface of the optical signal device 10. Alternatively, the lettering 20 may also be realized as the only transparent surface of the optical signal device 10.

Sensor 14 is, for example, an ultrasonic sensor which periodically emits ultrasonic signals and calculates the distance to the respective object located in front of the sensor from the time difference between the emitted sound waves and the received sound reflections. Alternatively, it is also possible to utilize other types of sensors, for example optical sensors, camera-based sensors or radar-based sensors.

The indicating device 2 is designed as a very compact unit that may be utilized in place of a commonly used warning lamp in a door trim or lining or the like. As indicated earlier, to prevent excessive triggering of warning signals of optical or acoustic nature, it is expedient to operate the optical signal device 10 and/or the acoustic device 12 only if the aircraft is on the ground and the opening of the aircraft door is imminent. This may be achieved particularly easily by receiving an enable signal at the enable signal input 56, 58 which, however, requires a data line or single line with a logic signal to a central unit on board the aircraft.

In the embodiment of the indicating device 2 shown, an acceleration measuring unit or an inertial measurement unit (inertial platform or IMU, respectively) 22 (or 48 in FIG. 8) is integrated, which is obscured here and which is adapted or configured to acquire the spatial movements of the aircraft and to transmit them to the electronics unit 16. The fact that an aircraft has landed may be determined from significant events, for example a landing shock after a continuous descent. If this event has occurred, the electronics unit 16 can carry out the approach detection and the optical or acoustic warnings controlled thereby.

Figure 2:
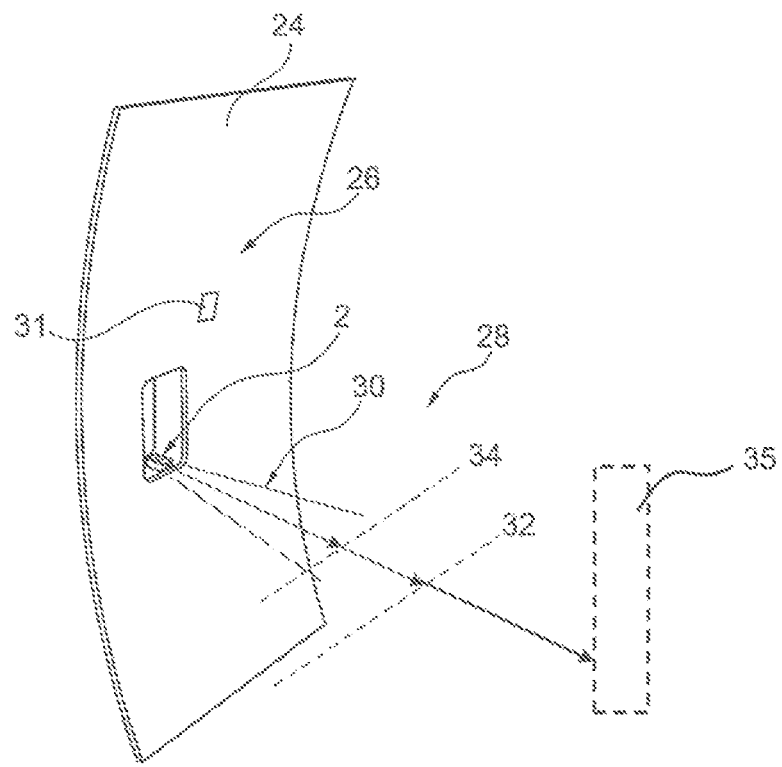
FIG. 2 depicts a possible installation position of the indicating device.

FIG. 2 depicts as an example an aircraft door 24 comprising a door trim or lining 26 that faces the interior of the aircraft fuselage. If the aircraft is located on a runway or in a parked position, the door 24 is opened from the inside of the aircraft. The indicating device 2 is integrated on or into the door trim 26, wherein the visible side 8 faces the interior of the aircraft.

Thus, if a person is in front of the door 24, the person is within the detection zone of the sensor 14. As indicated, the sensor 14 monitors a space 28 inside the aircraft and there defines a detection zone 30. The electronics unit 16 may, for example, define a first limit distance 32 as well as a second limit distance 34, wherein the electronics unit 16 operates the optical signal device 10 as soon as a person comes closer than the first limit distance 32 and wherein the acoustic signal device 12 is operated as soon as a person comes closer than the second limit distance 34. An expedient distance for the first limit distance 32 is a maximum of 1.1 m and preferably 0.9 m. An expedient distance for the second limit distance 34 is a maximum of 0.5 m and preferably 0.35 m.

If a person is located between the two lines indicating the limit distances 32 and 34, the person is only made aware optically, for example by a flashing light, to the fact that the emergency slide is still activated. If the person comes closer to the door 24, an additional acoustic signaling is effected if the distance to the door 24 is close to an arm's length. It is of course possible to make the two limit distances 32 and 34 equal so that an optical and an acoustic signaling occurs simultaneously. Finally, preferably, provision is made that the electronics unit 16 operates the optical signal device 10 and the acoustic signal device 12 so as to emit a continuous light or a continuous warning sound, respectively, if the door opening lever is moved a predetermined distance towards the door-open position while the emergency slide is armed. To this end the electronics unit 16 is preferably connected via a further input to a sensor that monitors the position of the door opening lever.

Moreover, the detection zone 30 of the sensor 14 is chosen and oriented in such a way that, when the door 24 is closed, a stationary component 35 of the aircraft, for example a wall of an on-board galley, is located inside the detection zone 30 in a defined distance from the sensor 14. If, with the door 24 closed, the electronics unit 16 is in its monitoring mode it monitors whether the defined distance varies or changes by more than a predefined limit value. As soon as this is the case it is an indication that an opening of the door has occurred which, as can be seen from FIG. 6, causes an increase in the distance between the door 24 and the stationary component 35. The electronics unit then outputs a control signal to the memory 9, which causes a first predetermined value to be stored at a predetermined storage location of the memory 9. This value indicates that an opening of the door 24 has occurred, and it can only be reset by the reset device 17, which will be described later with reference to FIG. 8. As has been explained above, the storing of the first predetermined value may also be caused by a non-authorized person having gained access to the aircraft in some other way and moving through the detection zone 30 of the sensor 14.

Figure 3:
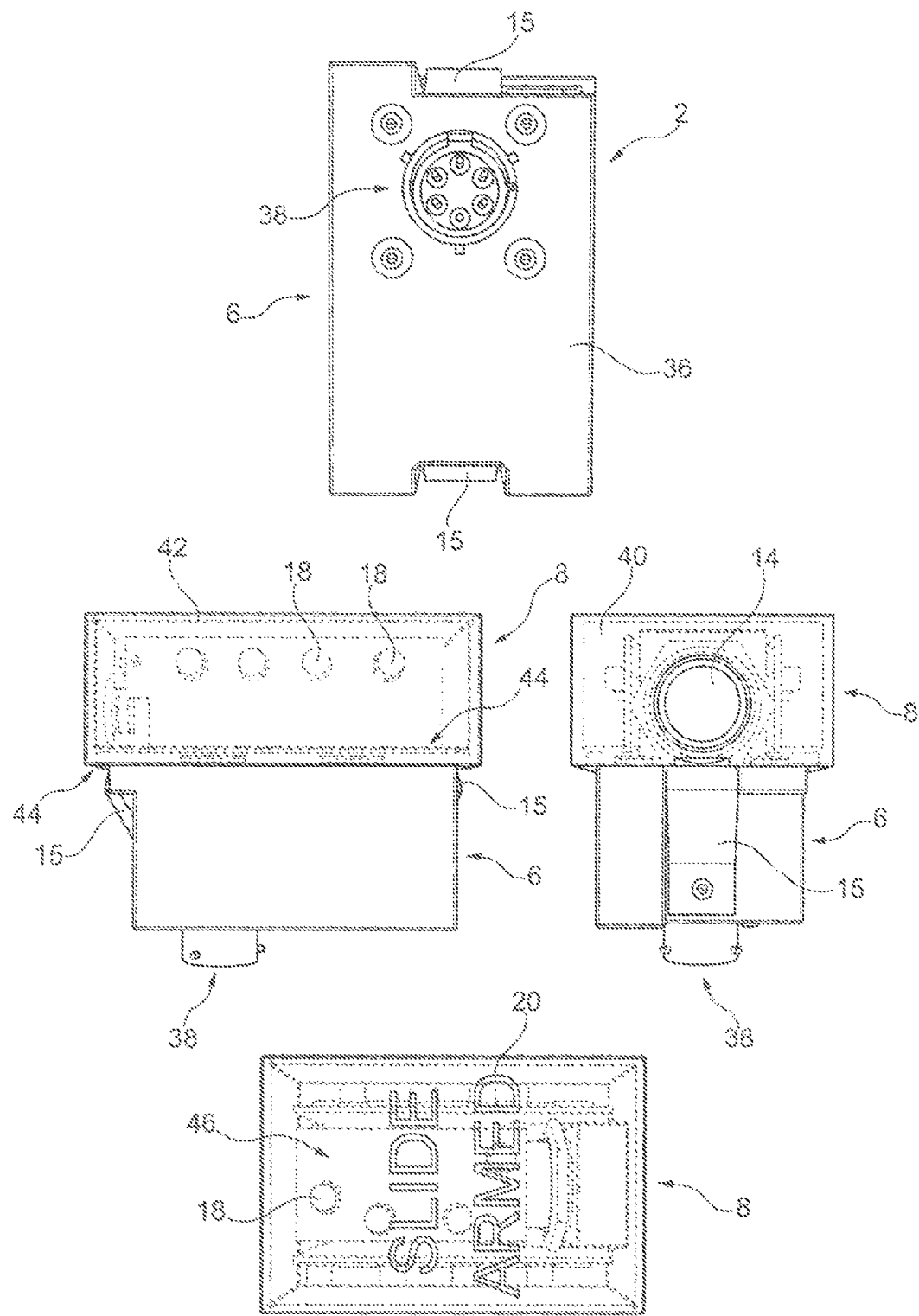
FIG. 3 depicts the indicating device in a four-side-view.

FIG. 3 shows a four-side illustration of the indicating device 2, in which an underside 36 is shown with an electrical connection 38, which is to be connected to a power supply of the door 24 and which further coupled to a sensor (not shown) that monitors the emergency slide activation lever 31, and which electrical connection 38 may also, depending on the aircraft type, be implemented as an outgoing breakout cable having a connecting plug connected at the end. This may be achieved either via an enable signal that depends on the position of the emergency slide activation lever 31, or via a power supply that is dependent on the position of the emergency slide activation lever 31.

A narrow end 40 of the visible section 8 comprises primarily the sensor 14 which, when installed as shown in FIG. 2, points directly into the interior of the aircraft fuselage. On a side wall 42 the illuminating devices 18 are recognizable, which are distributed along the side wall 42 inside the cover 13. The fastening section 6 is designed to be narrower than the visible section 8 so that, when the indicating device 2 is clipped or snapped into an opening, an edge 44 facing the fastening section 6 can abut a rim of the respective opening and the retaining clips 15 promote a flush contact of the edge 44 with the rim of the respective opening.

The lettering 20 is arranged on an upper side 46 and extends there essentially across the available width of the cover 13. Through the transparency of the cover 13 further illuminating devices 18 are recognizable, providing a backlight for the lettering 20.

Figure 4:
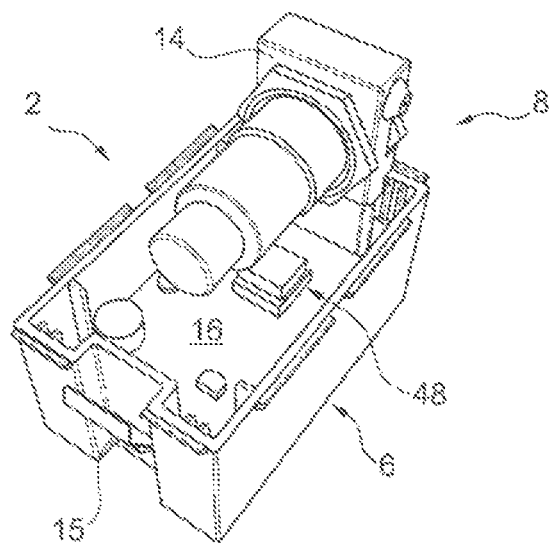
FIG. 4 shows the indicating device in a partially dismantled view.

FIG. 4 depicts, furthermore, the indicating device 2 in a partially dismantled state, wherein here an acceleration measuring unit 48 integrated into the electronics unit 16 can be seen, which acceleration measuring unit 48 can detect the movement of the indicating device 2 and thus that of the aircraft. Through evaluation of significant or characteristic events, such as that of a landing shock and a successive rapid reduction of the longitudinal speed caused by braking, it can be determined unambiguously that the aircraft is on the ground. This event may trigger an enable signal that initiates the activation of the approach or proximity detection in the space in front of the door 24.

Figure 5:
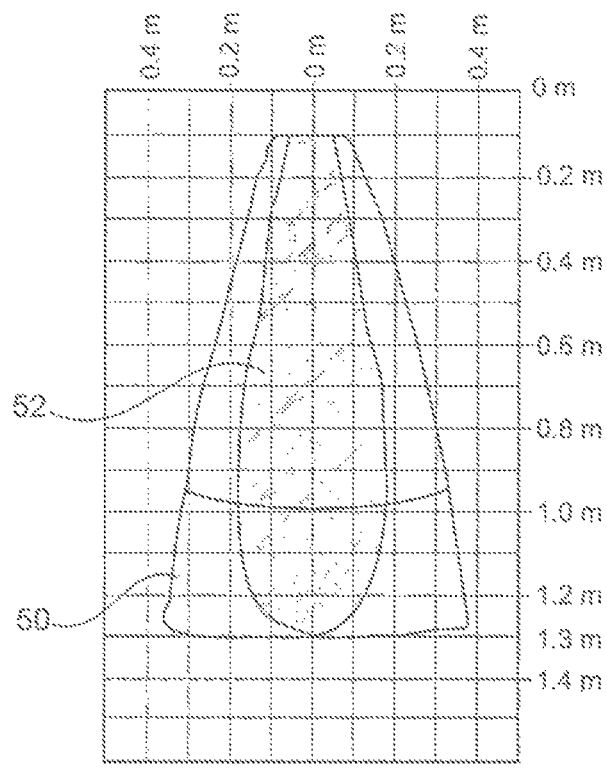
FIG. 5 depicts possible sonic cones of an ultrasonic sensor of the indicating device.

A diagram in FIG. 5, moreover, shows two preferred sonic beams 50 and 52 of the ultrasonic sensor 14, wherein the sonic beam 50 belongs to an ultrasonic sensor with oriented plate and the sonic beam 52 belongs to an ultrasonic sensor with a pipe of 27 mm diameter, for example. For the precise recognition of a person directly in front of the ultrasonic sensor who approaches the door 24, and for the precise recognition of a change in distance to the stationary component 35, the sonic beam should be set as narrow as possible so that a width of significantly less than one meter and preferably 0.3 to 0.7 m is achieved. The detection zone 28 is thus quite narrow and allows ignoring persons and items that are at a greater lateral distance. In contrast to the solution with a pipe, the use of an oriented plate provides a slightly wider sonic beam 50.

Figure 7:
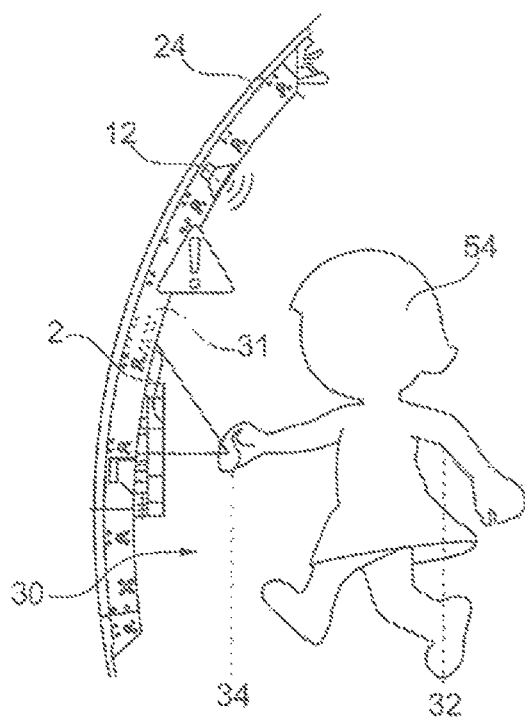
FIG. 7 shows a person in front of the aircraft door and a triggered indication.

In FIG. 7 a person 54 approaching the door 24 and, in this process, already having passed beyond the first limit distance 32 and having reached the second limit is depicted. An optical and an acoustic warning is emitted simultaneously so that the person 54 is warned unambiguously not to open the door 24 with an emergency slide activation lever 31 in the armed position.

Figure 8:
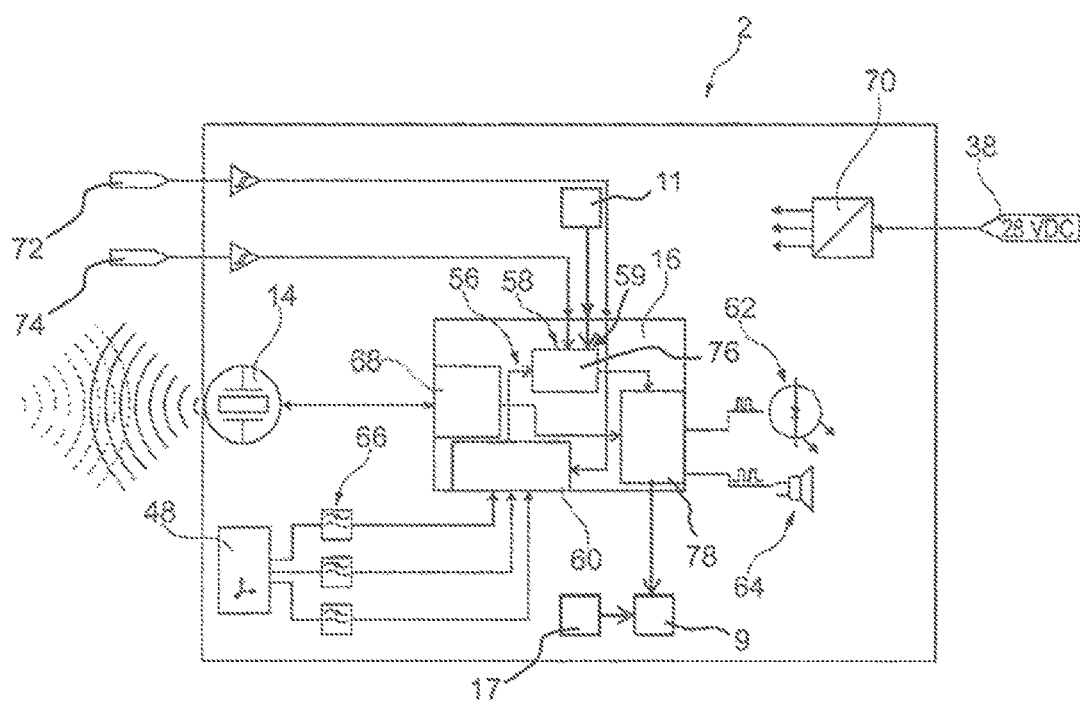
FIG. 8 depicts the indicating device in a schematic block diagram.

Finally FIG. 8 depicts an exemplary embodiment of the indicating device 2 in a schematic block diagram. The ultrasonic sensor 14 and the acceleration measuring unit 48 are connected to the electronics unit 16, which also comprises three enable signal inputs 56, 58 and 59 on a logic module 76. The acceleration measuring unit 48 is able to generate an enable signal via a corresponding logic circuit 60, which enable signal represents or is indicative of a landing that has occurred, wherein the enable signal is in this case sent to the enable signal input 56. A further enable signal, which is present at a connection or terminal 74 that is connected to a detector for the position of an emergency slide activating lever, can be sent to the second enable signal input 58, which represents an armed position of the emergency slide activating lever. If the aircraft is on the ground and the emergency slide activating lever is in an armed or activated position, a monitoring of the detection zone 30 is initiated. If it is determined in the electronics unit 16 that an object is located within at least one limit distance 32, 34, an optical signal 62 and/or an acoustic signal 64 is triggered via an output signal stage 78. The enable or disable signal, respectively, for changing between the operating modes may, as has already been explained above, be sent to the enable signal input 59.

The reset device 17 is connected to the memory 9 and is, similar to the enabling device 11, designed as an RFID reading device. It is designed and configured in such a manner that it transmits at regular intervals a wireless interrogating signal together with a code assigned to it, and that it responds to a certain wireless response signal, which it receives from a passive RFID tag, which is supplied with power through the interrogating signal. The RFID tag, which forms a system together with the indicating device 2, is paired with the reset device 17, that is, it is configured in such a manner that it reacts to an interrogating signal having the code of the reset device 17 with the transmission of a response signal with a code assigned to the RFID tag. The reset device 17 analyses the response signal as to whether it contains the code of the RFID tag that it is paired with. Only when this is the case will it send a reset signal to the memory 9 which causes the memory 9 to store a second predetermined value that differs from the first predetermined value in the predetermined memory location. In this manner the memory 9 is prepared for a next monitoring task.

It goes without saying that filters 66 and 68 are connected downstream of the acceleration measuring unit 48 or the ultrasound sensor 14, respectively, so as to achieve a desired signal quality. Furthermore, a power supply unit 70 is connected to the connector 38. Additionally, a pin programming unit 72 is connected to the indicating device or is integrated therein to indicate in particular the orientation of the indicating device 2 relative to the flight direction.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An indicating device for indicating an unauthorized opening of a door of an aircraft parked on the ground, comprising:

a sensor configured to detect a distance between the sensor and an object that is located inside a detection zone in front of the sensor, a signaling device, which has a first state and a second state, a reset device that is connected to the signaling device and that is configured to set said signaling device into the first state when a user carries out a predetermined reset operation, an enabling device, which is configured to provide as an output signal, selectively, a predetermined disable signal and a predetermined first enable signal, and a control device, which is connected to the sensor, the signaling device and the enabling device and is configured:

to change into a first operating mode when receiving the disable signal and to change into a second operating mode when receiving the first enable signal, in which second operating mode the sensor detects, based upon a sensor signal provided by the sensor and characteristic for the distance between the sensor and the object, a change of the distance between the sensor and the object and, upon detection of a change, sets the signaling device into the second state until the predetermined reset operation is carried out, so that, following arrangement of the sensor on a door of the aircraft, which door is located at a distance from a stationary component in the interior of an aircraft, or on the stationary component in such a manner that the stationary component or the door, respectively, is located within the detection zone of the sensor and an opening of the door causes a change of the distance between the sensor and the stationary component or the sensor and the door, respectively, and the subsequent provision of the first enable signal by the enabling device with the door closed, a change of the signaling device from the first state into the second state indicates that the door has been opened, wherein the indicating device further comprises an acceleration measuring unit, which is configured to detect movement of the indicating device from which an enable signal initiates an activation of an approach or a proximity detection in a space in front of the door.

2. The indicating device according to claim 1, wherein the signaling device comprises a non-volatile electronic memory device and wherein the first state and the second state correspond to different predetermined values that are stored in a predetermined memory area of the memory device.

3. The indicating device according to claim 2, wherein the signaling device further comprises an optical signal device for emitting an optical signal or an acoustic signal device for emitting an acoustic signal, wherein the control device is adapted to operate, during or after the signaling device has been set into the second state, the optical signal device or the acoustic signal device to emit the optical signal and the acoustic signal, respectively.

4. The indicating device according to claim 1, wherein the sensor is adapted to detect the distance based upon the travel time of a signal, which is transmitted by the sensor or a separate signal emission device, is reflected by the object and received by the sensor.

5. The indicating device according to claim 4, wherein the sensor is an ultrasonic sensor.

6. The indicating device according to claim 1, wherein the enabling device comprises a receiver for receiving wireless signals and is adapted to provide the disable signal when receiving a first predefined wireless signal, and to provide the first enable signal when receiving a second predefined wireless signal.

7. The indicating device according to claim 6, wherein the receiver is an RFID receiver and that the first and second predefined wireless signal may be generated by an RFID transmitter with predefined identifier.

8. The indicating device according to claim 1, wherein the enabling device comprises a signal input for the wireless or wired reception of external signals, and is configured to provide as output signal the respective external signal that was received, or to provide the disable signal if a first predefined external signal is received and to provide the first enable signal if a second predefined external signal is received.

9. The indicating device according to claim 1, wherein the predetermined reset operation is the reception of a predefined reset signal by the indicating device.

10. The indicating device according to claim 1, which is configured as a continuous, compact unit that can be integrated into a door trim of an aircraft door.

11. The indicating device according to claim 10, which further comprises an optical signal device for emitting an optical signal and an acoustic signal device for emitting an acoustic signal, which are part of the unit, wherein the control device is configured to operate at least one of the optical signal device and the acoustic signal device when a person approaches to a distance that is less than a predetermined limit distance.

12. The indicating device according to claim 11, wherein the control device is configured to operate the optical signal device when a person approaches to a distance that is less than a first limit distance and the acoustic signal device when a person approaches to a distance that is less than a second limit distance, wherein the first limit distance is greater than the second limit distance.

13. The indicating device according to claim 10, which further comprises a housing with a fastening section and a visible side, where the fastening section is configured to undergo a mechanical connection with the door trim or a fastener on the aircraft door.

14. A door arrangement for an aircraft that comprises:

a door panel with a first side and an opposite second side that is adapted to be installed in an opening in a fuselage of an aircraft in such a manner that it is moveable between a closed position, in which it closes the opening and the first side faces an interior space of the aircraft and the second side faces outwardly, and an open position, in which the opening is accessible, and an indicating device for indicating an unauthorized opening of the aircraft door, comprising:

a sensor configured to detect a distance between the sensor and an object that is located inside a detection zone in front of the sensor, a signaling device, which has a first state and a second state, a reset device that is connected to the signaling device and that is configured to set said signaling device into the first state when a user carries out a predetermined reset operation, an enabling device, which is configured to provide as an output signal, selectively, a predetermined disable signal and a predetermined first enable signal, and a control device, which is connected to the sensor, the signaling device and the enabling device and is configured:

to change into a first operating mode when receiving the disable signal and to change into a second operating mode when receiving the first enable signal, in which second operating mode the sensor detects, based upon a sensor signal provided by the sensor and characteristic for the distance between the sensor and the object, a change of the distance between the sensor and the object and, upon detection of a change, sets the signaling device into the second state until the predetermined reset operation is carried out, so that, following arrangement of the sensor on a door of the aircraft, which door is located at a distance from a stationary component in the interior of an aircraft, or on the stationary component in such a manner that the stationary component or the door, respectively, is located within the detection zone of the sensor and an opening of the door causes a change of the distance between the sensor and the stationary component or the sensor and the door, respectively, and the subsequent provision of the first enable signal by the enabling device with the door closed, a change of the signaling device from the first state into the second state indicates that the door has been opened, wherein the sensor is arranged on the door panel, wherein the indicating device further comprises an acceleration measuring unit, which is configured to detect movement of the indicating device from which an enable signal initiates an activation of an approach or a proximity detection in a space in front of the door.

15. An aircraft comprising a fuselage in which an opening is formed, a door panel with a first side and an opposite second side that is adapted to be installed in the opening in such a manner that it is moveable between a closed position, in which it closes the opening and the first side faces an interior space of the aircraft and the second side faces outwardly, and an open position, in which the opening is accessible, a stationary component in the interior space of the aircraft, which stationary component is located at a distance from the door panel, and an indicating device for indicating an unauthorized opening of a door of an aircraft parked on the ground, comprising:

a sensor configured to detect a distance between the sensor and an object that is located inside a detection zone in front of the sensor, a signaling device, which has a first state and a second state, a reset device that is connected to the signaling device and that is configured to set said signaling device into the first state when a user carries out a predetermined reset operation, an enabling device, which is configured to provide as an output signal, selectively, a predetermined disable signal and a predetermined first enable signal, and a control device, which is connected to the sensor, the signaling device and the enabling device and is configured:

to change into a first operating mode when receiving the disable signal and to change into a second operating mode when receiving the first enable signal, in which second operating mode it detects, based upon a sensor signal provided by the sensor and characteristic for the distance between the sensor and the object, a change of the distance between the sensor and the object and, upon detection of a change, sets the signaling device into the second state until the predetermined reset operation is carried out, so that, following arrangement of the sensor on a door of the aircraft, which door is located at a distance from the stationary component in the interior of an aircraft, or on the stationary component in such a manner that the stationary component or the door, respectively, is located within the detection zone of the sensor and an opening of the door causes a change of the distance between the sensor and the stationary component or the sensor and the door, respectively, and the subsequent provision of the first enable signal by the enabling device with the door closed, a change of the signaling device from the first state into the second state indicates that the door has been opened, wherein the sensor is arranged on the door panel or on the stationary component in such a manner that the stationary component and the door panel, respectively, is located inside the detection zone of the sensor and an opening of the door panel causes a change of the distance between the sensor and the stationary component and the door panel, respectively, wherein the indicating device further comprises an acceleration measuring unit, which is configured to detect movement of the indicating device from which an enable signal initiates an activation of an approach or a proximity detection in a space in front of the door.

* * * * *